Patented May 28, 1935

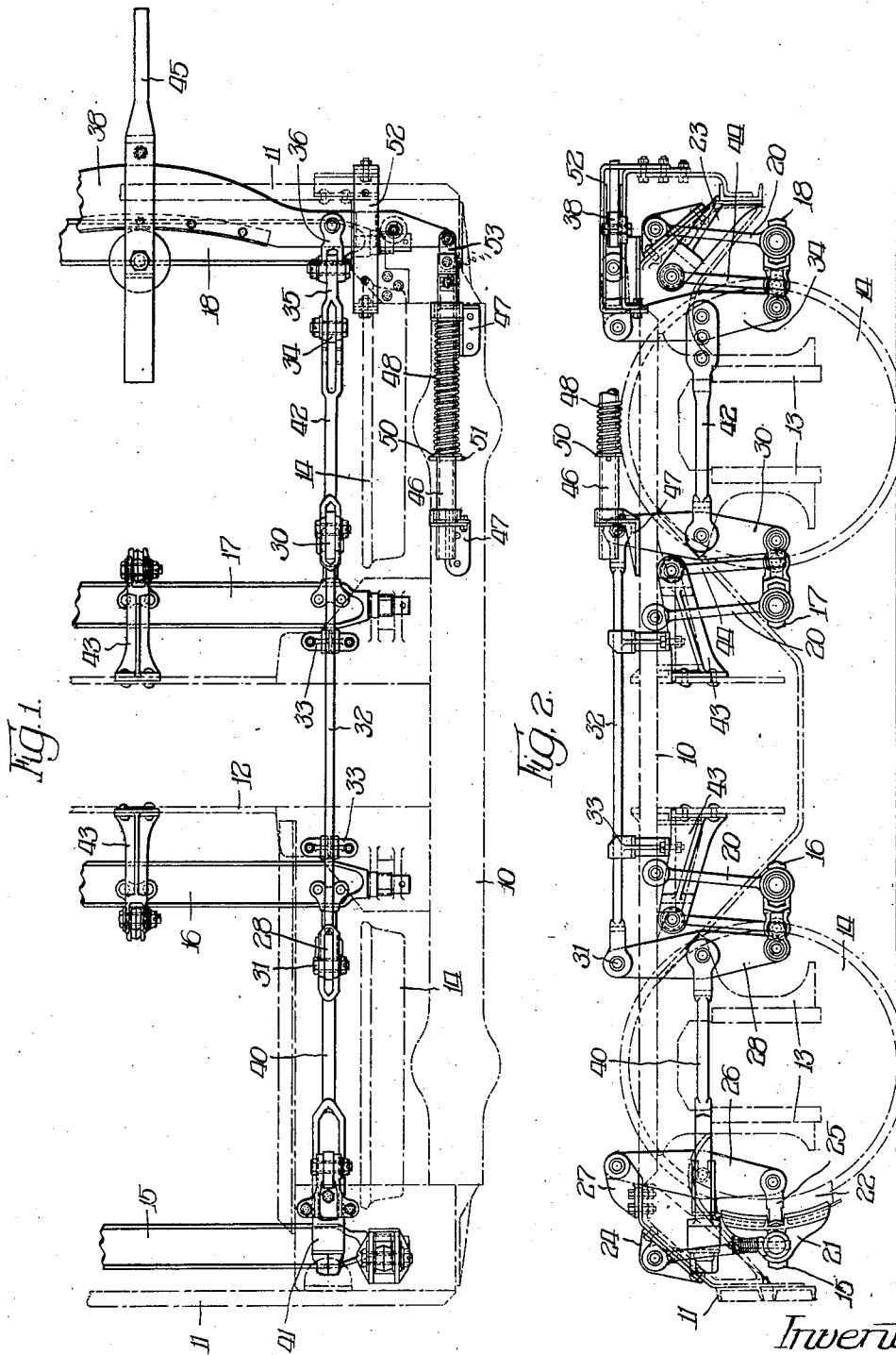

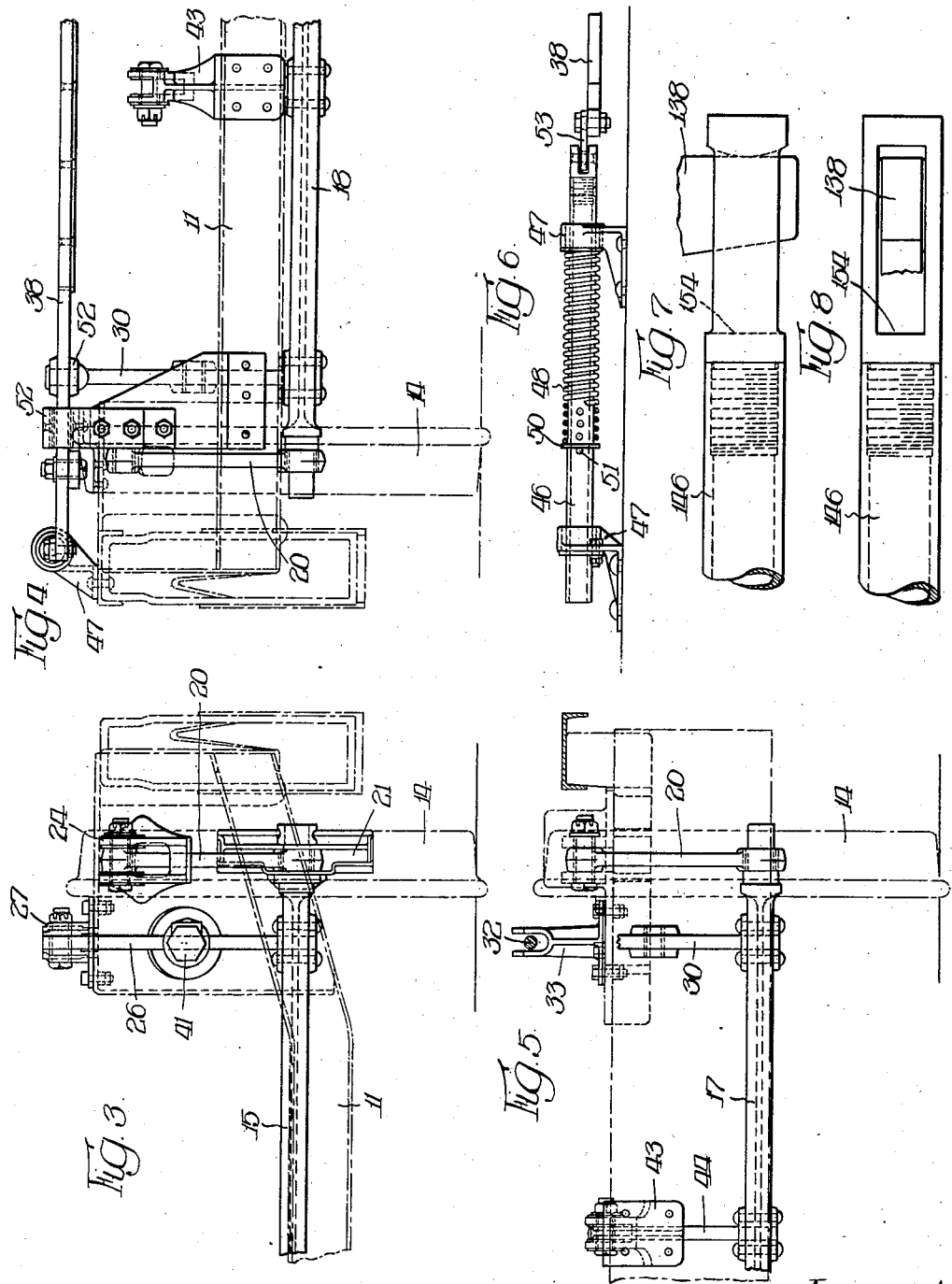

2,002,930

UNITED STATES PATENT OFFICE 2,002,930

BRAKE RIGGING

Walter H. Baselt, Chicago, Ill., assignor to American Steel Foundries, Chicago, Ill., a corporation of New Jersey Application July 30, 1932, Serial No. 626,289

22 Claims. (Cl. 188—56)

The invention relates to brake rigging for railway car trucks and has reference more particularly to brake rigging for clasp brakes for use on trailer trucks.

An object of the invention is to provide brake rigging adapted to meet service and clearance conditions prevailing in trailer trucks and which will incorporate novel and improved release means adapted to return the operative parts of the rigging to released position.

A further object of the invention is to provide brake rigging of the type wherein brake beams are located to each side of the wheel and axle assemblies of the truck, with truck levers operatively connected thereto and supported from the frame by means supporting the brake beams and brake heads.

A still further object is to provide release mechanism of simple construction, which will be positive and efficient in operation and which will insure increased flexibility permitting lateral movement of the radius bar.

With these and various other objects in view, the invention may consist of certain novel features of construction and operation, as will be more fully described and particularly pointed out in the specification, drawings and claims appended hereto.

In the drawings which illustrate an embodiment of the device and wherein like reference characters are used to designate like parts—

Figure 1 is a fragmentary top plan view of a trailer truck incorporating brake rigging and release mechanism constructed in accordance with the present invention;

Figure 2 is a view in side elevation of the structure shown in Figure 1;

Figure 3 is a fragmentary end view looking toward the right of Figure 1;

Figure 4 is a fragmentary end view looking toward the left of Figure 1 and showing particularly the radius bar and support for the same;

Figure 5 is a view in vertical cross section taken transversely through the center of the truck shown in Figure 1;

Figure 6 is a detail view in side elevation of the release mechanism;

Figure 7 is a plan view of a modified arrangement for connecting the radius bar to the release rod; and Figure 8 is a side elevational view of the structure shown in Figure 7.

Referring more particularly to the drawings, particularly Figures 1 and 2, the invention is shown in association with a truck formed of side frame members 10 joined by transverse end members 11 and transverse center members 12. Since the truck and brake rigging are symmetrical only one side is shown in the drawings and described with the belief that the explanation will be simplified for a better understanding of the invention.

The frame is supported at the ends on wheel and axle assemblies by journal boxes not shown, the side members 10 being provided with depending pedestals 13 for receiving the journal boxes and the wheels being illustrated diagrammatically at 14. On each side of the wheel and axle assemblies are located brake beams designated by 15, 16, 17 and 18, respectively, each brake beam at its ends being supported from the frame by brake hangers 20 pivoted to the frame at their upper ends and having association with brake heads 21 at their lower ends, the heads positioning brake shoes 22 against the tread of the wheels. In the particular trailer truck shown the ends of the side frame members 10 slope downwardly as at 23, and to provide a support for the hangers 20 for the outside beams the sloping ends of the frame are provided with hanger brackets 24.

The outside brake beam 15 is pivotally connected through tie link 25 to the lower end of a dead truck lever 26 fulcrumed at its upper end from the frame through the fulcrum bracket 27. The inside brake beams 16 and 17 likewise have pivotal connection through a similar tie link to truck levers which in this instance include live truck levers 28 and 30, respectively, the levers at their upper ends having pivotal connection as at 31 to a connecting pull rod 32 passing through guides 33 secured to the truck frame. The outside brake beam 18 has connection through a tie link to a live outside truck lever 34 pivotally connected at its end through a clevice 35 to link 36 pivotally connecting with the equalizer or radius bar 38.

Completing the brake rigging is a tie rod 40 having pivotal connection at its respective ends to the dead truck lever 26 and the live truck lever 28. The end of the tie rod connecting with truck lever 26 is provided with a slack adjuster 41 which can be manually operated to vary the point of connection between the dead truck lever and the tie rod so that slack in the rigging caused by brake shoe and wheel wear can be eliminated.

The inside truck lever 30 and the outside truck lever 34 are connected in a somewhat similar manner by the tie rod 42. It is to be noted that the tie rods have connection with the truck levers at a point intermediate their ends so that the rods are located above the car axles.

As an additional support for those brake beams having connection to live truck levers balance hangers are provided including supports 43 secured to the truck frame, and hangers 44 pivotally connected to the supports and rigidly fastened at their lower ends to the beams.

Actuation of the brake rigging to apply the brake shoes to the car wheels is accomplished through actuation of the main pull rod 45 having rolling connection with the radius bar 38, the bar thus being caused to move in a direction toward the right, Figure 1. The outside truck levers 34 are accordingly actuated to apply the brake shoes associated with brake beam 18 to the car wheels and like actuation is imparted to the inside truck lever 30 through the connecting tie rod 42. Movement of the truck levers 26 and 28 and their corresponding brake beams in a direction to apply the brake shoes to the car wheels is substantially simultaneous with the actuation of the first mentioned truck levers since the pairs of connected levers are operatively connected by the pull rod 32.

For releasing the brake rigging and returning the operative parts to full released position the present invention provides mechanism including a release rod 46 supported for reciprocating movement upon the side frame member 10 by brackets 47. Telescoped over the release rod is a coil spring 48 having one end in contact with the forward support for the rod and its other end in contact with washer 50 adjustably positioned on the rod by the pin 51. The ends of the radius bar are supported from the frame by supporting straps 52 and by means of a connecting link 53, Figure 6. The extreme outer ends of the radius bar have pivotal connection with the projecting end of the release rod 46 which end is bifurcated to receive the link.

In Figures 7 and 8 a modified arrangement is disclosed wherein the radius bar 138 projects through an elongated slot 154 provided in the projecting end of the release rod 146. Both means of connecting the radius bar with the release rod provide sufficient flexibility to allow limited lateral movement of the radius bar.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a car truck, the combination of pairs of wheels therefor, brake rigging for said wheels including brake beams and connected truck levers located to the inside and outside of the wheels respectively, rods connecting the levers on both sides of the truck, an equalizer bar supported by the truck frame and operatively connected to the truck levers, release means for resiliently returning said rigging to release position, said release means including spaced brackets mounted on said truck, a rod slidably mounted on said brackets, resilient means cooperating with said last named rod, and a flexible connection between said rod and the ends of the bar for permitting lateral movement of said equalizer bar.

2. In a car truck, the combination of pairs of wheels therefor, brake rigging for said wheels including brake beams and connected truck levers located to the inside and outside of the wheels respectively, rods connecting the levers on both sides of the truck, an equalizer bar, spaced supporting straps secured to the frame for supporting the bar, a link connecting the ends of the bar with the adjacent outside truck levers, release means for resiliently returning said rigging to release position, said release means including spaced brackets mounted on said truck, a rod slidably mounted on said brackets, resilient means cooperating with said last named rod, and a flexible connection between said rod and the ends of the bar for permitting lateral movement of said equalizer bar.

3. In a car truck, the combination of pairs of wheels therefor, brake rigging for said wheels including brake beams and connected truck levers located to the inside and outside of the wheels respectively, rods connecting the levers on both sides of the truck, an equalizer bar, spaced supporting straps secured to the frame for supporting the bar, means connecting the ends of the bar with the adjacent outside truck levers, release means for resiliently returning said rigging to release position, said release means including spaced brackets mounted on said truck, a rod slidably mounted on said brackets, resilient means cooperating with said last named rod, and a flexible connection between said rod and the ends of the bar for permitting lateral movement of said equalizer bar.

4. In a car truck, the combination of pairs of wheels therefor, brake rigging for said wheels including brake beams and connected truck levers located to the inside and outside of the wheels respectively, rods connecting the levers on both sides of the truck, an equalizer bar, spaced supporting straps secured to the frame for supporting the bar, links connecting the ends of the bar with the adjacent outside truck levers, release means for resiliently returning said rigging to release position, said release means including spaced brackets mounted on said truck, a rod slidably mounted on said brackets, resilient means cooperating with said last named rod, and a flexible connection between said rod and the ends of the bar for permitting lateral movement of said equalizer bar.

5. In a brake arrangement, the combination of a truck frame and a plurality of pairs of wheels, brake beams located on opposite sides of the wheels, hangers supporting said beams from the truck frame, pairs of truck levers operatively connected to each other and to their respective beams, an equalizer bar connected to certain of the truck levers, and a release spring rod having a compression release spring mounted thereon, said rod being supported from the truck frame by a plurality of brackets and having connection with the equalizer bar, said connection including a slotted jaw provided on said rod for loosely receiving a portion of said equalizer bar.

6. In a brake arrangement, the combination of a truck frame and a plurality of pairs of wheels, brake beams located on opposite sides of the wheels, hangers supporting said beams from the truck frame, pairs of truck levers operatively connected to each other and to their respective beams, an equalizer bar connected to certain of the truck levers, and a release spring rod having a compression release spring mounted thereon, said rod being supported from the truck frame by a plurality of brackets, and a link connecting the end of said equalizer bar to said release spring rod.

7. In a brake arrangement, the combination of a truck frame and a plurality of wheels, brake beams located on opposite sides of the wheels, hangers supporting said beams from the truck frame, pairs of truck levers operatively connected to each other and to their respective beams, an equalizer bar connected to certain of the truck levers, a release spring rod and a compression release spring mounted thereon, said rod being supported from the truck frame by a plurality of brackets, said release spring rod having a jaw end, and a link connecting the end of said equalizer bar to the said jaw end.

8. In a brake arrangement, the combination of a truck frame and a plurality of pairs of wheels, brake beams located on opposite sides of the wheels, hangers supporting said beams from the truck frame, pairs of truck levers operatively connected to each other and to their respective beams, an equalizer bar connected to certain of the truck levers, a release spring rod and a compression release spring mounted thereon, said rod being supported from the truck frame by a plurality of brackets, said release spring rod having a jaw end, and a link connecting the end of said equalizer bar to said jaw end, the connection between said release spring rod and said link being so shaped as to permit their unrestricted movement through one of said supporting brackets.

9. In a release spring mechanism for brake rigging, a plurality of supporting brackets mounted on the side rail of a car truck, a release spring rod mounted in said brackets and supporting a compression release spring, said release spring rod having a jaw end and a link secured thereto for connection to a brake equalizer bar, the connection between said jaw end and said link being so shaped as to permit their unrestricted movement through one of said supporting brackets.

10. In a brake rigging, the combination of a truck frame and a pair of wheels, brake beams located on opposite sides of the wheels and having connection at their ends to brake heads, pairs of truck levers operatively connected to each other and to the brake beams respectively, an equalizer bar connected to said brake rigging, release means for resiliently returning said rigging to release position, said release means including spaced brackets mounted on said truck, a rod slidably mounted on said brackets, resilient means cooperating with said last named rod, and a flexible connection between said rod and the ends of the bar for permitting lateral movement of said equalizer bar, said flexible connection including links pivotally connected to said last named rod and equalizer bar.

11. In a brake rigging, the combination of a truck frame and a pair of wheels, brake beams located on opposite sides of the wheels and having connection at their ends to brake heads, pairs of truck levers operatively connected to each other and to the brake beams respectively, an equalizer bar connected to certain of the truck levers, release means for resiliently returning said rigging to release position, said release means including spaced brackets mounted on said truck, a rod slidably mounted on said brackets, resilient means cooperating with said last named rod, and a flexible connection between said rod and the ends of the bar for permitting lateral movement of said equalizer bar, said flexible connection including links pivotally connected to said last named rod and equalizer bar.

12. In a brake arrangement, the combination of a truck frame, brake rigging supported therefrom, an equalizer bar for operating said brake rigging, and release means supported on said truck frame, said release means including spaced brackets and a rod slidably supported thereby, said rod being loosely connected to said equalizer bar for permitting relative lateral movement therebetween.

13. In a brake arrangement, the combination of a truck frame, brake rigging supported therefrom, an equalizer bar for operating said brake rigging, release means supported on said truck frame and including spaced brackets and a rod slidably supported thereby, and a link interposed between said rod and equalizer bar for permitting relative lateral movement therebetween.

14. In a brake arrangement, the combination of a truck frame, brake rigging supported therefrom, an equalizer bar for operating said brake rigging, and release means supported on said truck frame, said release means being provided with a slotted jaw embracing said equalizer bar for permitting relative lateral movement therebetween.

15. In a brake arrangement, the combination of a truck frame, brake rigging supported therefrom, an equalizer bar for operating said brake rigging, and release means supported on said truck frame, said release means including a spring controlled bar, one of said bars having means embracing the other of said bars for permitting relative lateral movement therebetween.

16. In a brake arrangement, the combination of a truck frame, brake rigging supported therefrom, an equalizer bar for operating said brake rigging, and release means supported on said truck frame, said release means including a spring controlled bar, one of said bars having a slotted jaw embracing the other of said bars for permitting relative lateral movement therebetween.

17. In a car truck having side rails, the combination of brake rigging, a plurality of supporting brackets mounted on the side rail of a car truck, release spring mechanism for said brake rigging, said mechanism including a release spring rod mounted in said brackets and supporting a compression release spring, said release spring rod having a slotted end for connection to a brake equalizer bar, said slotted end being so shaped as to permit its unrestricted movement through one of said supporting brackets.

18. In a car truck having side rails, the combination of brake rigging, a plurality of supporting brackets mounted on the side rail of a car truck, release spring mechanism for said brake rigging, said mechanism including a release spring rod mounted in said brackets and supporting a release spring, a spring seat on said rod, said spring being confined between said seat and one of said brackets, said release spring rod having a slotted end for connection to a brake equalizer bar, said slotted end being so shaped as to permit its unrestricted movement through one of said supporting brackets.

19. In a brake arrangement, the combination of a release spring rod, spaced supporting means for said rod, a release spring for said rod for moving the same linearly in said supporting means, an equalizer bar, and means for flexibly connecting said equalizer bar to said rod to permit lateral movement of the same relative to the movement of said rod.

20. In a brake arrangement, the combination of a release spring rod, spaced supporting means for said rod, a compression release spring for said rod and cooperating with one of said supports and said rod for moving the same linearly in said supporting means, an equalizer bar, and means for flexibly connecting said equalizer bar to said rod to permit lateral movement of the same relative to the movement of said rod.

21. In a car truck, the combination of wheels therefor, brake rigging for said wheels, an equalizer bar for operating said rigging, a release spring rod for said equalizer bar, means for supporting said rod to provide only for linear movement thereof, a release spring for moving said rod in said supporting means, and means connecting said rod and equalizer to permit lateral movement of the same relative to the movement of said rod.

22. In a car truck, the combination of wheels therefor, brake rigging for said wheels, an equalizer bar for operating said rigging, a release spring rod for said equalizer bar, spaced brackets for supporting said rod to provide only for linear movement thereof, a release spring cooperating with one of said brackets and with said rod for movement of said rod, and means connecting said rod and equalizer to permit lateral movement of the same relative to the movement of said rod.

WALTER H. BASELT.